United States Patent [19]
Lundin et al.

[11] Patent Number: 5,339,430
[45] Date of Patent: Aug. 16, 1994

[54] SYSTEM FOR DYNAMIC RUN-TIME BINDING OF SOFTWARE MODULES IN A COMPUTER SYSTEM

[75] Inventors: Kenneth Lundin, Södertälje; Ulf Markström, Stockholm, both of Sweden

[73] Assignee: Telefonaktiebolaget L M Ericsson, Stockholm, Sweden

[21] Appl. No.: 907,307

[22] Filed: Jul. 1, 1992

[51] Int. Cl.$^5$ ............................................. G06F 9/44
[52] U.S. Cl. ........................... 395/700; 364/280;
364/281.8; 364/281.3; 364/284; 364/280.9;
364/DIG. 1
[58] Field of Search .......... 395/700, 600, 650;
320/110.1

[56] References Cited

U.S. PATENT DOCUMENTS

| | | | |
|---|---|---|---|
| 4,369,983 | 8/1983 | Segarra et al. | 364/200 |
| 4,649,473 | 3/1987 | Hammer et al. | 364/200 |
| 4,688,170 | 8/1987 | Waite et al. | 364/200 |
| 4,787,028 | 11/1988 | Finfrock et al. | 364/200 |
| 5,093,916 | 3/1992 | Karp et al. | 395/700 |
| 5,175,828 | 12/1992 | Hall et al. | 395/375 |
| 5,182,750 | 1/1993 | Bales et al. | 370/110.1 |
| 5,182,751 | 1/1993 | Bales et al. | 370/110.1 |
| 5,185,742 | 2/1993 | Bales et al. | 370/110.1 |
| 5,212,787 | 5/1993 | Baker et al. | 395/600 |

FOREIGN PATENT DOCUMENTS

| | | |
|---|---|---|
| 0518195A2 | 12/1992 | European Pat. Off. . |
| 1-239633(A) | 9/1989 | Japan . |
| 1-307825(A) | 12/1989 | Japan . |
| 2242293A | 9/1991 | United Kingdom . |
| 2258068A | 1/1993 | United Kingdom . |

OTHER PUBLICATIONS

R. C. Summers and C. Wood; "Message-Based Protocol for Interprocessor Communication"; IBM Technical Disclosure Bulletin, vol. 22, No. 7, Dec. 1979, pp. 2893-2895.

R. R. Marsicek, T. S. McDermott, W. D. Modlin, J. G. Sams and C. E. Stricklin; "Distribute Data Processing System"; IBM Technical Bulletin, vol. 23, No. 5, Oct. 1980, pp. 1805-1810.

*Primary Examiner*—Kevin A. Kriess
*Attorney, Agent, or Firm*—Johnson & Wortley

[57] ABSTRACT

In telecommunications switching systems, software is frequently modified, enhanced or replaced altogether by new versions. The implementation or integration of the new or revised software into the operational system must be accomplished in accordance with strict requirements for not disturbing the ongoing activities of the system. Therefore, it is desirable that the system not be halted while the change to the new software is made. Rather, the preferred approach is to be able to replace software modules with new versions on the fly, during system operation. The smooth modification made possible in the disclosed system allows such changes with minimal disturbance to ongoing activities by dynamically linking and binding software modules during execution. The disclosed system accomplishes this by applying expanded object-oriented programming techniques and utilizing language-independent interface specifications that remain unchanged and that obviate the need for storing symbolic information that would be subject to change following modification.

35 Claims, 5 Drawing Sheets

SYSTEM FOR DYNAMIC RUN-TIME BINDING OF SOFTWARE MODULES IN A COMPUTER SYSTEM

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyrights whatsoever.

FIELD OF THE INVENTION

The invention relates to the modification of software, and in particular, to the replacement of software in an operating computer system having both old and new versions of modified software coexisting in the computer and simultaneously executable therein.

DESCRIPTION OF RELATED ART

The system of the present invention, a linked procedure call mechanism for dynamically binding separately and simultaneously executable versions of software during Operation of a computing system to allow transparent, uninterrupted updating of software, can best be understood by reference to the larger problem of incorporating modified software into an operating computer system. One aspect of computer software is that it must be periodically updated with revisions, additions and/or deletions in order to continue to provide adequate functionality to the user, to optimize the software and to correct errors and discrepancies that arise throughout the life of the software. As new features are added to software, it is desirable to replace the old software with the new versions as early and as easily as possible in order to provide the user with the features of the new software.

In certain types of computing systems, such as stand-alone or batch processing systems, changing software from one version to another presents few obstacles. Typically, the computer system is merely shut down during a period of the day when there is little activity and maintenance personnel are readily available. The old software is then simply removed and replaced by the newer version of the software. Thereafter, the computing system is restarted and all future data processing is done with the new version of the software. This procedure, of course, assumes that the new software has been adequately tested and debugged on an offline system to the point that the software personnel and the operational management are confident that it will adequately perform the functions for which it is intended without undue interruptions that may require halting and then re-starting the entire computing system.

In other types of computing systems, such as modern stored program control (SPC) telecommunications exchange systems (commonly referred to in the industry simply as "switches"), neither the testing of new versions of software nor the changing of software in the system is as easy as in standalone batch processing systems. For example, new versions of software cannot be effectively tested without being placed into actual operation processing calls. The software must be tested while in operation in order to determine whether the software will adequately function under live operating conditions and whether the new portions will properly interface with all of the other software blocks that form a part of an operational SPC switching system. In addition, telecommunications switching systems are virtually never out of operation. Ideally, these systems would run perpetually, without interruption because of the continuous need for communications services within a community. That is, there is a continuous flow of telecommunications traffic being processed through the system even at off hours of the day or night and any interruption in the operation of the switch results in a disruption of that telecommunications traffic. Such a disruption could be extremely damaging to the system's operation and its effectiveness, as well as to its acceptance among users or customers of the system.

These real-time requirements of telecommunications switching exchanges place severe constraints on both the testing of enhanced versions of the software, or portions thereof, containing new or improved functionality, as well as the substitution of software containing error corrections or "bug fixes" into the switch without disrupting existing telecommunications traffic being processed by the switch. Therefore, integrating new versions of software components or units into the system using the traditional "edit-compile-link-load-run" approach is not desirable. What is preferred is a method that provides the capability to modify or extend the software while the system is in operation, without the need for any downtime.

Attempts have been made to solve the problems associated with incorporating new software into operating computer systems. For example, some advanced on-line operational systems in use today that do not operate in a stand-alone or batch fashion solve the problem of replacing old software in a manner that clearly differs from the method used with stand-alone or batch systems. However, such systems still replace software manually, although more transparently than in stand-alone systems, by requiring that individual users or user groups actively select whether or not to process using the new or revised version of the software. This option may be exercised by users by modifying the concatenation of software to be utilized by processes operating under their individual user-id. The option remains available to users during a fixed period of time, usually measured in weeks or months, in which time the software migrates up several levels in the concatenation structure after successfully operating at each prior level without any discrepancies. Upon reaching the top level of the concatenation, the software is declared "operational" and older versions are no longer available to users of the system. Insertion of new software into the system, as well as its migration up the various levels, is controlled by a process of configuration management—a manual process of reporting, approval, tracking software versions at each level and implementing approved changes.

As with the methods used to update software on batch or stand-alone systems, there are well known drawbacks to incorporating new or modified software into a system in this fashion. It is largely a manual, labor intensive system that is complex and time consuming. It leaves control over whether and in what cases the system will operate with certain new software to the users with no means of performing gradual, restricted, on-line use so that errors do not proliferate or immediately affect all ongoing operations. The method of controlling access to new or revised software is directly linked and limited to the individual user executing the software.

In the typical telecommunications system in use today, the problem of changing software or portions of software is even more severe. Although such systems cannot properly be called batch or stand-alone systems, their operation must also be halted whenever a software change is made. The new software is then loaded and the data, along with the old software, is transported to the new software. During the time when this transport is occurring, the system is completely out of operation. This period can last as long as an hour, making it necessary to schedule software changes for off-peak hours of operation. Even so, an hour of downtime in a telecommunications switching system is a very long and costly period because no calls can be processed during this time and any needs for emergency communications during this period cannot be serviced.

The problem of changing software during execution within a computing system becomes more complicated when all or a part of the software requires linking. Ordinarily, in such systems, separate portions of the software must be developed and re-compiled separately. Then all the portions that interoperate must be relinked for execution. It is also necessary to create and maintain symbol tables that provide information for all external symbols used throughout the software. The linking process creates the information for storage in the table and identifies any unresolved references. When a portion of the software is modified, for any reason, the symbol information is likely to become changed as well. Therefore, any symbol information remaining in memory must be removed or it will bring about errors in processing caused by incorrect symbolic referencing.

One system, disclosed in U.S. patent application Ser. No. 07/907,294, filed Jul. 1, 1992 in the name of Nilsson et al, entitled "Changing Software During Computer Operations," and assigned to Telefonaktiebolaget L M Ericsson, hereby incorporated by reference herein, describes a system and method to overcome some of the limitations in changing software "on the fly." That system provides for the installation of new software into the stores of the telecommunications system along with, and in addition to, the old software. In that system, existing traffic in the computer system is initially processed by the old software and test traffic is routed through the switch for processing by the new software. Thereafter, if the test traffic is handled successfully by the new software, a portion of the actual live traffic is selectively routed through the new software with the live traffic still being handled by the old software. Should the sample traffic be carried adequately by the new software, all of the traffic is switched to the new software. As soon as the processing of all calls being handled by the old software has been completed, the old software is no longer utilized by the system and may be removed.

That disclosed system provides for smooth verification of new or modified software. It allows data to flow through the new software in a gradual and controlled manner, yet as part of the live operational system. The system provides for early detection of errors and discrepancies with little or no impact to actual operation of a telecommunications switching system because the initial data routed to the new software is only test data generated by the system. If, in processing test data, the telecommunications system detects an error, no further traffic is directed to the new software so that, even if the new software had been processing actual data, disturbance to the overall traffic of the system is minimized.

This disclosed system also redirects traffic from the old software to the new software in a gradual manner. The disclosed system includes the capability to allow transactions that began processing with the old software to complete its processing using only the old software. Only transactions that began subsequent to the installation of the new software will be processed by the new software. This aspect of the disclosed system results in only a minimal disturbance to users during a transition phase from certain old software to its replacement by or augmentation with new software. Further, this aspect minimizes the amount of data requiring conversion for and/or transfer to a different set of software than that with which it was initially processed.

Other attempts to solve at least some of the problems associated with updating software in operational computer systems have focused on different aspects representing only a portion of the overall problem, in particular, the linking issue. For example, in U.S. patent application Ser. No. 734,456, filed on Jul. 19, 1991, containing an invention by Anders Abrahamsson and Lars Holmqvist and assigned to Telefonaktiebolaget L M Ericsson, there is disclosed a system for dynamically linking software during run-time. That system, however, involves a complex system of indirect addressing that requires use of either a specialized or extended operating system and/or a special compiler. That system has several other limitations, including the need for a non-standard operating system. Further, this system will not work with standard applications software.

Other related art has been discussed in various publications. For example, the article entitled "Future Documents" published in BYTE MAGAZINE relates to object linking and embedding while U.S. Pat. No. 4,791,550 to Stevenson et al relates to link pointers and U.S. Pat. No. 4,667,546 to Freeman et al deals with intrusion into unguarded regions of memory. None of these references discloses solutions to the problems discussed above.

Therefore, it would be highly useful within the telecommunications industry to be able to efficiently perform dynamic runtime linking between separately loaded program units in a computer system. The system of the present invention provides such a method.

SUMMARY OF THE INVENTION

The system of the present invention comprises a system for dynamically binding software modules between two or more separately loadable software applications. This aspect of the system of the present invention embodies the inventive combination of a linked procedure call mechanism with the capability to perform dynamic runtime binding between separately loadable program units in a computing system.

In one aspect, the system of the present invention comprises a linked procedure call mechanism that embodies a trader within the operating system kernel to enable an interface between different software units. This linked procedure call mechanism is also used to effect the inter-linking and binding of old and new software units during runtime. In employing this linked procedure call mechanism in the system of the present invention, the necessary interface specification is created utilizing another aspect of the system of the present invention, a specialized language referred to as an object-oriented interface description language (ELIN) as disclosed in U.S. patent application Ser. No. 07/907,293, filed on Jul. 1, 1992 in the name of Lundin et al and assigned to Telefonaktiebolaget L M Ericsson, hereby incorporated by reference herein. This language contains special constructs specially designed for the development of interfaces for the linked procedure call aspect of the system of the present invention. Because these interface specifications contain attributes supported by an object-oriented paradigm, polymorphism and dynamic binding of objects having a common base interface specification can be readily achieved.

In another aspect, the system of the present invention comprises a mechanism by which program units may be constructed and later modified separately in a running system without causing any disturbance to the ongoing operations of the computing or telecommunications system in which it operates. According to this aspect, the program units are constructed and compiled separately using a language-independent interface specification. This aspect allows program units to be modified and changed independently so long as the interfaces remain unaltered. This aspect of the system of the present invention provides the added advantage of eliminating the need to store symbol information for use in linking since the binding occurs at runtime.

In yet another aspect of the system of the present invention, linked procedure call (LPC) objects are created and manipulated in a manner similar to that of objects of local classes in an object-oriented paradigm. This aspect of the linked procedure call mechanism is transparent to the programmers of the system. The transparency is achieved, in this aspect of the system of the present invention, through the automatic generation of code that performs the runtime binding in accordance with the interface specification. This aspect of the present invention provides the advantage that standard language compilers may be used, without requiring any extensions and without the need to modify the LPC model.

In still another aspect, the system of the present invention comprises a set of direction points used to dynamically direct transactions (also referred to as "threads" or "chains of events") within the operational system to either new or old versions of a modified software unit. The system accomplishes the dynamic direction through a number of means, including analysis of messages addressed by function title, which makes it possible to direct messages to either a process executing a new version of a software unit or to a process executing an old version. Another type of direction point is dynamic run-time binding (e.g., linked procedure call) between software units which makes it possible within a process to execute a new or an old version of a software unit.

As will be readily appreciated by those of ordinary skill in this particular art, the principles and aspects of this invention could also be utilized to advantage the runtime conversion of software in a variety of computer applications other than telecommunications switching systems.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION

The system of the present invention utilizes, in some aspects, principles of object-oriented programming. Object-oriented programming involves essentially four elements: classes, objects, instance variables (or data members as implemented in C++), and methods (or member functions in C++). A class is simply a template used to define objects, which are instances of the class they are created from. Classes have two types of components: instance variables and methods. Instance variables serve as data elements and methods serve as functions, i.e. they define an object's behavior. Instance variables and methods can be combined in a single common object in execution time. That is, an object encapsulates an instance of the variables which can be manipulated by using the combined methods. Hence, programming is performed with a focus on objects, rather than on the functions or tasks to be performed.

Certain techniques of object-oriented programming, well known in the art, are incorporated into the system of the present invention in the preferred implementation of the system of the present invention in the programming language C++. Such techniques include inheritance, polymorphism and encapsulation. Inheritance enables a new class to be derived from an existing class so that code is easily reusable, so that data and code can be added to a class or the behavior of a class can be altered, without having to change the existing class. Polymorphism is the property that provides the ability to use different types of objects in the same way because the different object types share a common interface. Inheritance of interfaces is the property that makes it possible to derive other object types from a common denominator. Finally, encapsulation is a technique for combining the data and operations needed to process the data all under one "roof." It further allows the capability to protect the data from excessive or unnecessary access and to hide the details of the data organization.

Figure 1A:
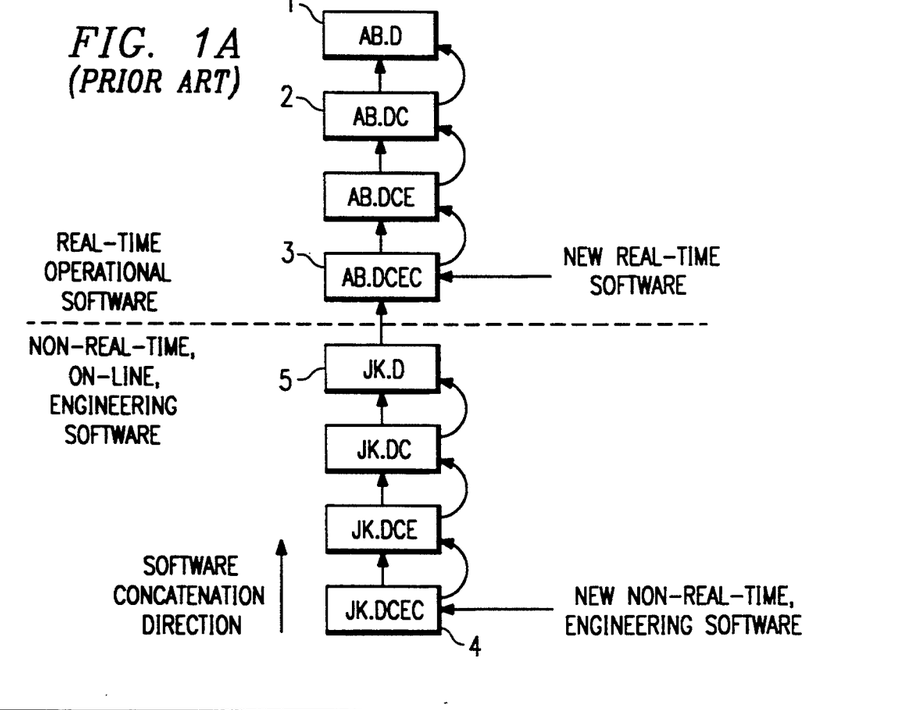
FIGS. 1A-1B are diagrammatic illustrations of a prior art system for controlling the introduction of new or modified software to an operational software system.

Referring first to FIG. 1A, there is illustrated a software control scheme utilized in a prior art system for managing the introduction of new or modified software into an operational software system. FIG. 1A illustrates a hierarchical set of software levels, the contents of each of which is controlled by the members of a review board. All changes to the software must be approved by this board prior to such changes being implemented in the system. No software will be integrated into the system until the review board makes a formal determination that the software is needed, that it has been adequately tested and that it is not likely to cause damage or interruption to the system.

The hierarchy of levels may be composed of several separate hierarchies linked together by an individual user who has access to and need for those levels or "libraries" of software to perform his or her function. At the top of the hierarchy 1 is the real-time, operational software that is typically most widely used and most strictly controlled ("AB.D"). Below this level is a change library 2, designated by the additional letter C in the suffix ("AB.DC"). Lower levels of operational software within the hierarchy may belong to different groups of users within the system and will be controlled by review boards at those levels. New or modified real-time software enters the system, after approval, at the lowest appropriate change level, i.e., a level that ends with the letter C as at 2 and 3.

Once new or modified software enters the system, it remains at the entry level until a specified period has passed and the software has produced no detectable errors. It will then migrate to the next highest level. In some cases, this will require advance approval by a specified review board; in other cases the migration will occur automatically, as part of a regularly scheduled system activity. The migrations are transparent to the users and the software will be available immediately upon migration or entry to the hierarchy to users who have structured their software concatenation to access software in the libraries containing the new or changed software.

As also illustrated in FIG. 1A, the same process may be repeated and occurring simultaneously for non-real-time engineering type software that resides within the same system. The only difference in this case is that the control process is managed by a different set of people and the process may not be as rigorous as that for operational software used generally throughout the system for critical processes. The integration of the software occurs in the same manner for this engineering software as with operational software, however. The new or modified software enters the hierarchy at the lowest appropriate change level as designated by a C as the last letter in the suffix, as at 4. It then migrates in an upward direction over time, with the necessary approvals, until it reaches the top 5 of its portion of the hierarchy. With either engineering or operational software, once it has migrated to the next level it no longer resides at the lower level.

The decision whether to utilize the new or modified software entered into the system's hierarchical libraries is left to the individual user or user group. The user(s) may select which levels of the libraries the system is to use in concatenating software for their use. They may choose to bypass lower levels of software altogether or they may simply choose to avoid the lowest change level which contains the newest and least tested software. The highest level of each portion of the hierarchy, of course, contains the bulk of the in-use operational software.

Figure 1B:
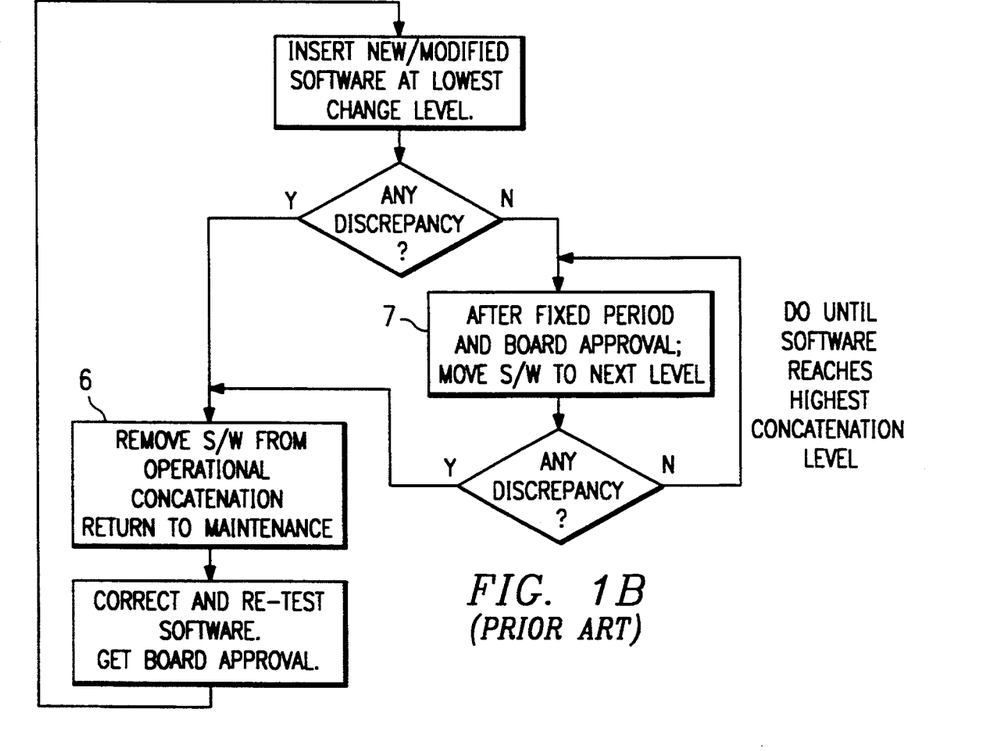

FIG. 1B illustrates the human process of configuration control that is imposed upon the software library hierarchy illustrated in FIG. 1A in order to maintain control over both the baseline and the new or modified software being introduced to the system on a daily basis. As noted above, the new software enters the hierarchy at the lowest appropriate change level following approval by the review board. If the new software results in errors or discrepancies, the software is removed from the hierarchy and returned for additional software maintenance work as at 6. Once the problems have been corrected and the software has been retested, it may once again, upon board approval, be integrated into the system at the lowest change level. If no problems are detected within the fixed period allowed, the software will automatically migrate to the next level unless the next level requires another board approval as at 7. Otherwise, it will migrate on a fixed schedule after having been properly approved. This process will continue to be repeated until the software reaches the highest level in that portion of the hierarchy at which time it will be declared fully operational software.

Figure 2:
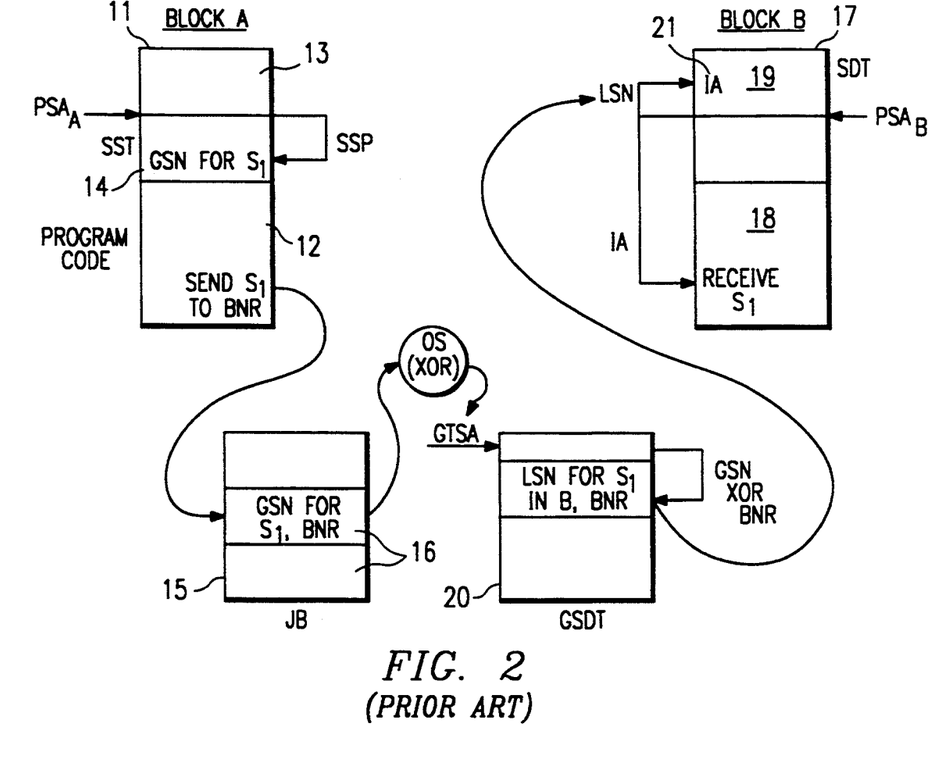
FIG. 2 is a diagrammatic representation of the manner in which software blocks may be dynamically linked in accordance with the invention of an above-referenced co-pending application.

Referring next to FIG. 2, there is shown a diagrammatic representation of the transfer of software signal information within a modular software system in accordance with a previously disclosed invention. A block of modular software 11, referred to as block A, comprises the plurality of sections including program code listing portion 12, a signal distribution table 13 and a software signal sending table 14. In addition, a job buffer 15 comprises a plurality of registers 16 within which is temporarily stored software signals awaiting processing by the central processor necessary to forward those signals to a requesting block of software, for example. Another software block, Block B 17, also includes a program code listing portion 18 and a signal distribution table 19. The represented embodiment of the invention also includes a global signal distribution table 20 within which there is maintained a listing of all of the local signal numbers for the particular signals contained in each block of software loaded in the system.

As discussed briefly above, the global signal distribution table 20 is an essential element of maintaining the linkage addresses among different modules of software. The global signal distribution table 20 maintains the cross-references between the global signal numbers corresponding to particular signals being sent from one module or block to another and the local signal numbers corresponding to each of those signals within each individual block in the system. When a block of software is loaded into the system, the portion of the global signal distribution table 20 corresponding to that block is rewritten to include a local signal number for each signal which is included within the block of software. This is conventionally done by combining the global signal number of that particular signal with the block number of the software block containing that signal through an exclusive-or process or some other technique of combining. Thus, when a software block is removed from the system, modified or enhanced in some way that results in changes to the individual signals within the block, that portion of the software signal distribution table must be rewritten to reflect the new content of signals within the block and a new calculation of local signals numbers for each of those signals within the block.

As further illustrated in FIG. 2, a software signal S1 is being sent from block A 1 to block B 17. Block B 17 is referred to as the receiving block, while block A 11 is referred to as the sending block. The block number of the receiving block is also referred to as the BNR. The system is to send the desired signal S1 to the receiving block and first obtain the global signal number for signal S1 by accessing the signal sending table 14 of block A 11 by means of its address comprising the program start address of block A 11 ($PSA_A$) plus the value of the signal sending pointer (SSP). Once the global signal number for S1 is obtained, it is loaded directly into a register 16 within job buffer 15 and awaits transfer to block B in accordance with the priority protocols of the central processing unit and the priority assigned to the particular signal being transferred. During this time, the information was retained in the form of the global signal number of S1 and the block number of the receiving block. As soon as the signal transfer operation has risen to a sufficient level of priority for the transfer to be executed, the system accesses the global signal distribution table 20 to obtain the local signal number of S1 in block B 17. This is accomplished by entering the global signal distribution table 20 with the address found by taking the global signal number and exclusive-oring that value with the block number BNR. Within this table at that address is found the local signal number for S1 in Block B 17, the receiving block.

Once the local signal number for S1 in block B 17 is obtained, the system then enters block B 17 by locating the instruction address, IA 21, within block B 17 where the signal should be entered. This is done by obtaining from the signal distribution table 19 of block B 17 by taking the program start address of block B 17, ($PSA_B$) minus the local signal number within block B 17 to read the instruction address 21. Once the instruction address 21 is obtained, the signal S1 is entered into block B 17 and the transfer is complete. Thereafter, the instruction located at the IA 21 begins execution.

One point must be kept in mind in connection with the application of this disclosed system. When modifying code affecting a signal entry point in a block, it must be kept in mind that if the data structures are modified, calls of that new or modified code may reach old parameter values, e.g., signal data accompanying the signal in the job buffer that contain addresses and or data in the format of the data structure that was utilized before modification. On the other hand, however, if the block at the time of reloading the newly modified software block has return addresses, the local signal numbers on the return address stack that have been modified as between the old and new versions are updated by the operating system.

Figure 3:
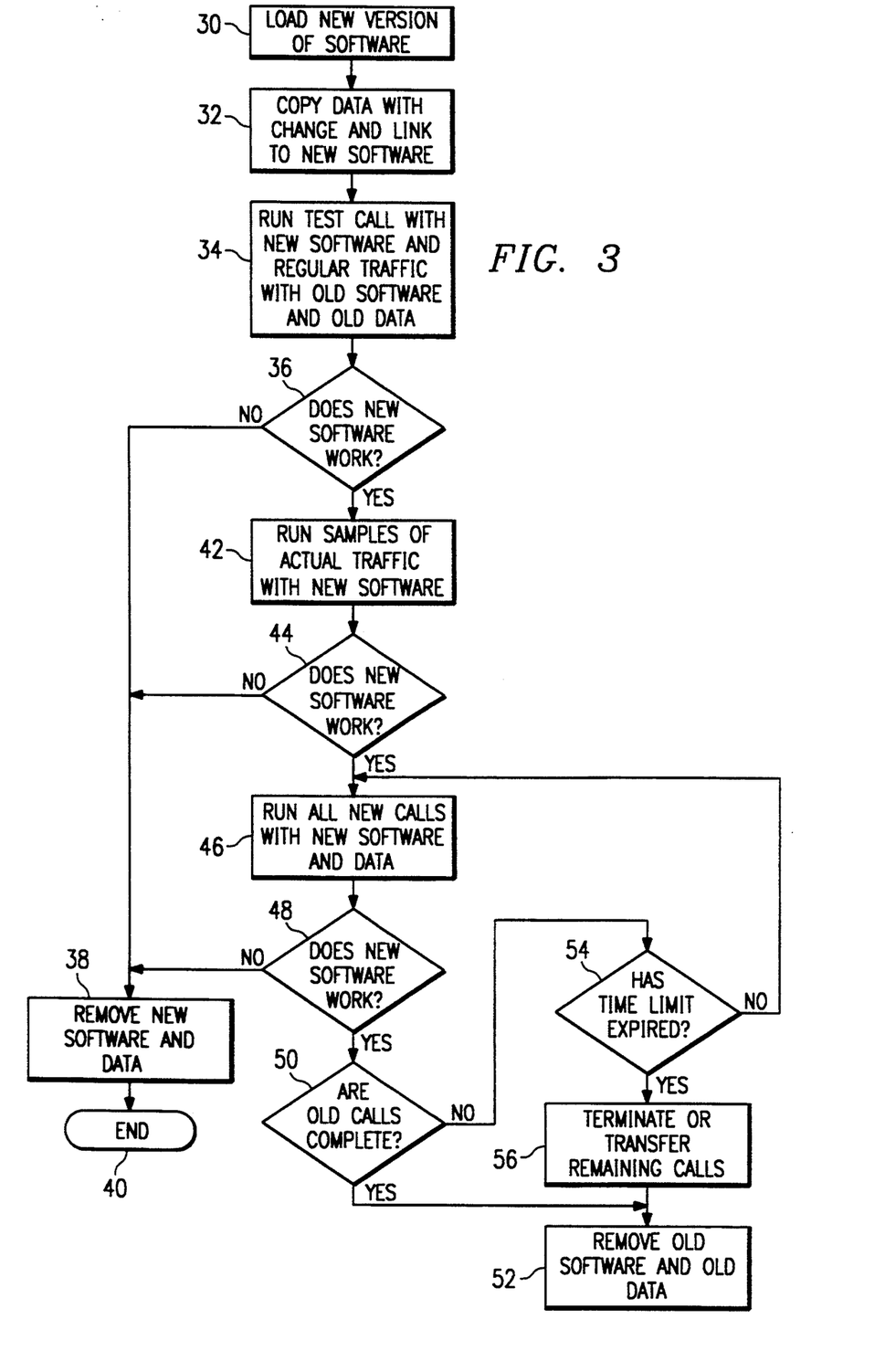
FIG. 3 is a flow chart illustrating the process of changing software during runtime in accordance with the invention of the above-reference co-pending application entitled, "Changing Software During Computer Operations"

Referring next to FIG. 3, there is shown a flow chart illustrating the smooth modification method of transition from an old software version to a new software version. In particular, the system presupposes that existing software is actively running in the system and begins at 30, with the loading of a new versions of the software into memory. At 32, the system copies the data with its changes in the new version, and links it to the new software. At 34, the system begins to run test calls with the new software and normal traffic continues to run within the system with the old software and the old data. At 36, the system queries "does the new software work on the test traffic?" If not, the system moves to 38 at which point the new software and database is removed from the system and the procedure ends at 40. If the new software does work on the test traffic at 36, the system moves to 42, at which point it runs samples of actual traffic with the new software while maintaining the remainder of the normal traffic along with the old software and old data. Next, at 44, the system again queries whether or not the new software is working on the sample traffic. If not, the system moves to 38, and the new software and database are removed to end the process. If, however, the new software is processing sample traffic successfully at 44, the system moves to run all future calls with the new software and the data at 46. Thereafter, at 48, the system again queries whether or not the new software is working and if not, moves to 38 to remove the new software and end at 40. If the new software is working on running the normal traffic in the system at 48, the system queries whether all the old calls have yet been completed or not within the system at 50, and if not, queries if the time limit for the change has expired at 54 and if not continues to: (1) run all new calls with the new software, and (2) run all old calls with the old software at 46 until a yes is received at 50 or the time limit has expired at 54. If the time limit has expired at 54, the system terminates or transfers all remaining calls to the new software at 56 and moves to 52. Thereafter, the system moves to 52 and the old software is removed along with the old data, and the system has made a switch during runtime from old software to new software without unduly endangering or delaying existing traffic within the telecommunications switch.

In effecting the linking of individual calls to different blocks of software, such as in the example where new telecommunications processing software if first tested with test calls before normal calls are redirected from the old software to the new, the system of the present invention may be visualized as containing a Call Identification (ID) category and a Pointer ID category. For each call address within the system which is a test call, a pointer to new software is given, while for all call IDs containing a normal identification, the pointer is given to the old software. The use of such pointers illustrates the method by which the system of the present invention is able to properly direct both ordinary, live traffic and test traffic to the proper version of software.

While this is the general simplistic interpretation of the manner in which the old and new software are addressed within the system of the present invention, in fact, detailed linked procedure call mechanisms are used to create dynamic runtime binding between separately loaded program units. That is, when replacing a program unit in the example discussed above, the old and the new versions of the software coexist for a time until the new version can be verified as correct and activities being executed in the old version can be ended as described above. The system of the present invention uses trading as a means to access the software through an interface via the linked procedure call. In loadtime, all interfaces accessible to the linked procedure call are published to a trader function in the kernel. Every interface is published with its identity and an address which refers to a method that creates an object from the interface. The binding between the software versions is made in runtime and every time an object is created for a specific interface, a request is directed to the trader for the address of the create method which is then called and returns an object pointer to the created object.

Figure 4:
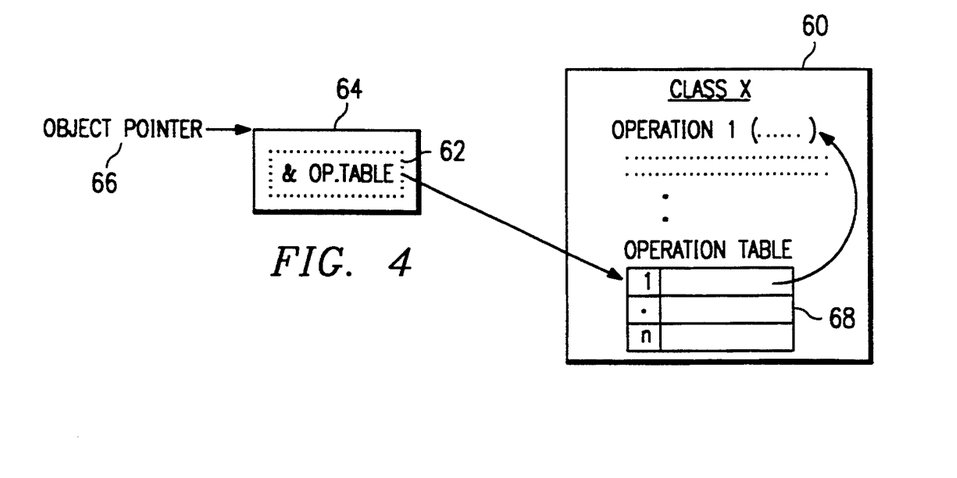
FIG. 4 is a block diagram illustrating the manner in which object operations are addressed within the software of the system of the present invention.

Referring next to FIG. 4 it is illustrated therein that, each operation on an object of class X 60 is called indirectly through the object in the following steps: (1) the object pointer 66 addresses the object's data area; (2) at a predefined offset from the start of the object area the address of an operation table 68 can be found 62 (this table 68 is common for all objects of one type); and (3) the address where the program code of the operation starts can be found in the operation table 68 at an offset corresponding to the operation at choice. Because the location of the addresses of the operation tables within the objects-data and the order in which the addresses in the operation tables are stored are fixed and known, operations can be called without assistance from the trader. One such operation in an interface that can be called without the trader is an operation to delete a created object.

Use of these operation tables provides the ability to achieve polymorphism, a concept that can be implemented using, for example, the programming language C++ and its construct for virtual tables. Polymorphism, meaning "many shapes," is a technique by which the behavior of a component that is shared by different objects can be changed. In other words, a component may appear the same in all cases, but may have the ability to perform in a somewhat different manner in connection with different objects with which it is associated. Polymorphism is useful in allowing the creation of families of objects that are related, i.e., they have a common origin or base, but they perform differently in different situations. This allows each object within a family to have methods or functions with identical names although the actual code for each object's methods may differ vastly. The system of the present invention utilizes polymorphism, as well as other principles of object oriented programming. The system of the present invention, however, implements and extends the principles in a new and highly useful manner, in order to achieve dynamic, transparent inter-linking of different versions of software during execution.

Figure 5:
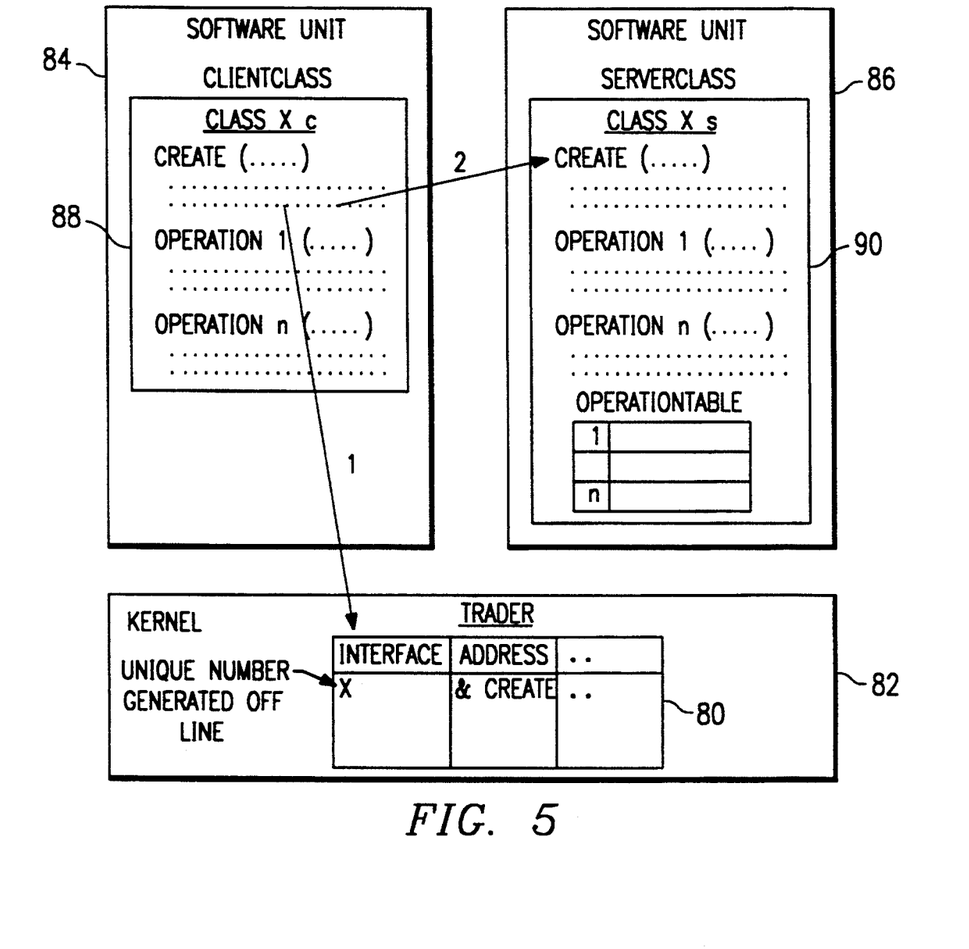
FIG. 5 is a block diagram illustrating the manner in which software is addressed within the system of the present invention.

Referring next to FIG. 5, there is illustrated therein the fact that the linked procedure call mechanism used in the present invention embodies the concept of a trader 80 contained within a kernel 82 which enables an interfacing relationship between a pair of software units 84 and 86, containing, respectively, a client class 88 and a server class of objects 90. FIG. 5 illustrates in detail the steps required in order to create objects within the system as shown also in FIG. 4.

Objects are run-time instances of classes that contain definitions of both data and functions within a single package or unit. Because they are able to contain both data and code, they act as miniature, independent programs. They can be used, therefore, as building blocks in creating more complex programs without having to redevelop the code necessary for those functions. Because they can be maintained and modified independently, program maintenance and revision is simplified.

A class is a template that is used to define an object, and an object is an instance of a class. A class contains two component types, instance variables or data members and methods or member functions. In order to support programmers developing programs that play the client role within the computer system, a client-class is automatically generated through the use of an interface specification. The generated client-class acts as a sort of agent for the server-class. The client of the system calls operations from the client-class objects in order to ensure that calls are transferred to the software implementation residing in the server-class. Therefore, all code relating to the dynamic binding function is found in the client-class.

Class declarations control the manner in which the compiler will store the addresses in the objects-data and in what order the addresses in the operations tables will be set forth. Some class declarations are automatically generated by the system. When an object is created within the system, its "create method" can be located through a request to the trader 80 portion of the operation system located within the kernel 82. The trader 80 contains all the interface information for all by linked procedure call accessible classes within the system, i.e., it contains information for each object about which other objects it is accessible by or to.

Figure 6:
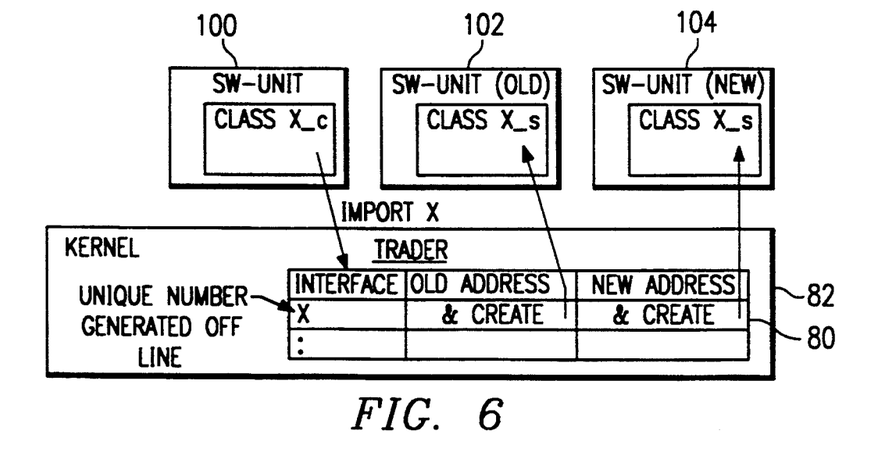
FIG. 6 is a block diagram illustrating the manner in which software can be addressed by means of the trader in the system of the present invention.

The diagram of FIG. 6 illustrates the way in which a process in run-time can be linked by linked procedure call to using a new or an old software unit. The trader 80 within the kernel 82 can direct the execution of the software unit 100 toward either the old software unit 102 or the new software unit 104. While making the replacement, the server-classes from both the old and the new versions each have their interfaces published in the trader 80. The trader 80 contains two address entries for each item, one for the old software unit 102 and one for the new software unit 104. Processes created prior to the replacement will continue to use the old software unit 102 and its server classes while processes created during and after the replacement may be directed to use the new software unit 104 and it's server classes.

After the replacement has been completed and activities within the old software unit 102 have ended, the old software unit 102 can be removed from memory and the interfaces published by the server-classes in the old software unit 102 may be withdrawn. If an attempt to withdraw these server-classes from memory is made prior to all processes within the old software unit running to completion, the system generates an exception call from the kernel 82. An exception handling process within the system then allows the non-completed process the opportunity to redirect itself and utilize the new software unit 104 or else to terminate.

The invention uses shared memory for storing the executable program code contained in the software units which makes it possible for all processes within the processors to execute the program code in this shared memory. This means that activities within different processes within a processor do not have to copy and relocate program code when making the dynamic run-time binding. The dynamic run-time binding (or linked procedure call) is therefore a very fast and real time efficient mechanism since no relocation or copying of programs is required in run-time.

One of the advantages of using the trader mechanism for dynamic run-time binding is that the software modules containing a client part of an interface does not have to be modified when the server part contained in another software module is changed. That is, no references to the server part have to be changed as long as the interface specification is unchanged.

When defining a unique interface specification in the interface description language ELIN, which is described below, a unique number is generated off-line for that interface separating it from all other interfaces. This number is used in real time by the server part to publish an interface in the trader and by the client part at the dynamic run-time binding through the trader mechanism. Using this number instead of a string containing the unique interface name makes the algorithm for finding the server part to an interface more real time efficient. The algorithm for finding the server part in the trader mechanism can for instance be using hash technic or index table, which makes it almost as efficient as static binding of code but have the advantage that software modules can be changed in a smooth way without disturbing ongoing activities using old software.

In employing the linked procedure call mechanism in the present invention, the interface specification is written in an object oriented interface description language (ELIN). In this language, there is a special construct (ADT) that is specially aimed at the specification of linked procedure call interfaces. An ADT in the ELIN language is a specification of the interface provided by objects of certain types. These objects are well suited to be implemented as instances of a class if an object oriented programming language is employed. The specification of a linked procedure call interface in ELIN language comprises the following information:

(a) a name for the specification;
(b) other interfaces used as a base for this name;
(c) one or more constructors (used for creating instances); and
(d) zero or more method-specifications, each of which consists of a method name, arguments, return type and exceptions.

Set forth below, in code, is an example of an interface specification that could be used as part of this linked procedure call mechanism and that describes an interface to objects of a type called Stack:

```
ADT Stack IS
  BASE
    TelecomObject;
  METHODS
    CONSTRUCTOR (IN size Int);
    push (IN data Int);
    pop ( ) RETURNS Int;
END ADT Stack;
```

©1992 Telefonaktiebolaget L M Ericsson

This interface specification defines an ADT named Stack, the base ADT being called "TelecomObject." Objects of this ADT can accept process or message calls from the listed function members. Having a base identified for this ADT indicates that there is another specification of this type of ADT that is called TelecomObject. That base ADT also has certain specified methods which the current ADT, as an instance of the base ADT will inherit. The function members or methods specified in the above ADT definition are in addition to those specified in the base ADT. In sum, the above code comprises an ADT specification which is one type of interface specification that can be created within the system.

An interface can be derived from another interface which then is called the base interface of the derived interface. Interfaces can be derived from more than one other interface, with the derived interface inheriting from the operations of each of its base interfaces. The derived interface may, in addition, declare its own additional operations, although it may not define operations having the same name as those inherited from the base interfaces. It should be made clear that inheritance only affects the interface-level, not the implementation level.

Figure 7:
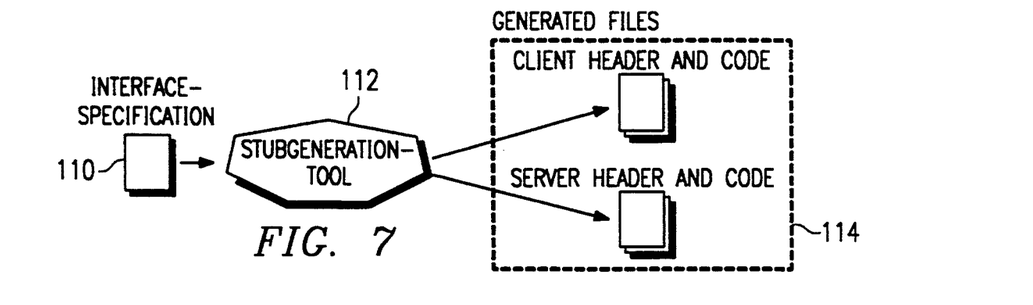
FIG. 7 is an illustrative diagram of the manner in which an object oriented interface description language is used to implement the system of the present invention.

As shown in FIG. 7, the system of the present invention also includes a stub-code generation tool 112 which is used to certify the coordination between the client and the server which are linked together dynamically in runtime through an interface. The interface is specified in a language independent fashion, but using the object oriented paradigm. The stub-code generation process ensures that a mapping to one of several programming languages is achieved and in the following sections, there is a brief description of how such a mapping in C++ can be performed. Referring to FIG. 7, there is illustrated a way in which an interface specification 110 employs the stub-generation tool 112 in connection with a set of generated files 114 in the system of the present invention. FIG. 7 illustrates, in particular, the overall structure of the C++ mapping as implemented in that language. An interface specification, written in the language (ELIN) as used in the system of the present invention, is similar to a class definition used in the programming language C++. Likewise, the mechanism for accessing operations through objects is similar to the manner in which the programming language C++ handles virtual functions. Therefore, the mapping on C++ illustrated in FIG. 7 is instructive as to the operation of this aspect of the system of the present invention.

The stub-generation tool 112 generates two files for both the client side and the server side, one with the suffix ".h" (header) and one with the suffix ".cc" (code). For the client, the ".h" or header file contains two class definitions. One class is an exact copy of the corresponding class in the server's ".h" or header file. This assures compatibility between the client and server and makes it possible for the client to call objects created by the server. This class' constructor is private, however, so that the class cannot be used to create automatic objects on the stack. The second class is the one to be used at the client that acts as an agent through which objects created by the server can be accessed.

For the server side, the corresponding two ".h" (header) and ".cc" (code) files are generated by the stub-generation tool 112. The contents Of the ".h" file consists of one class definition that will ensure compatibility with the client. This is the class that is used as a base for implementation. The implementation can be based directly on the generated class or the generated class can be used as a base from which to derive other classes. The ".cc" file contains a skeleton for the "createmethod" and a generated table with one entry for each linked procedure call interface whose createmethod address should be registered in the trader. The body of the createmethod is responsible for creating an object that is compatible with the generated class and returning a pointer to the newly created object as also illustrated in FIG. 4.

There are several reasons for generating differing yet compatible class definitions for the client and server sides rather than One shared class definition. First, it provides different levels of visibility for members in the client and the server. For example, a constructor must be public in the server but should not necessarily be public if it resides in the client. Second, the client and server programs can be linked together for test purposes without encountering the problem of name collisions if different classes are used.

Figure 8:
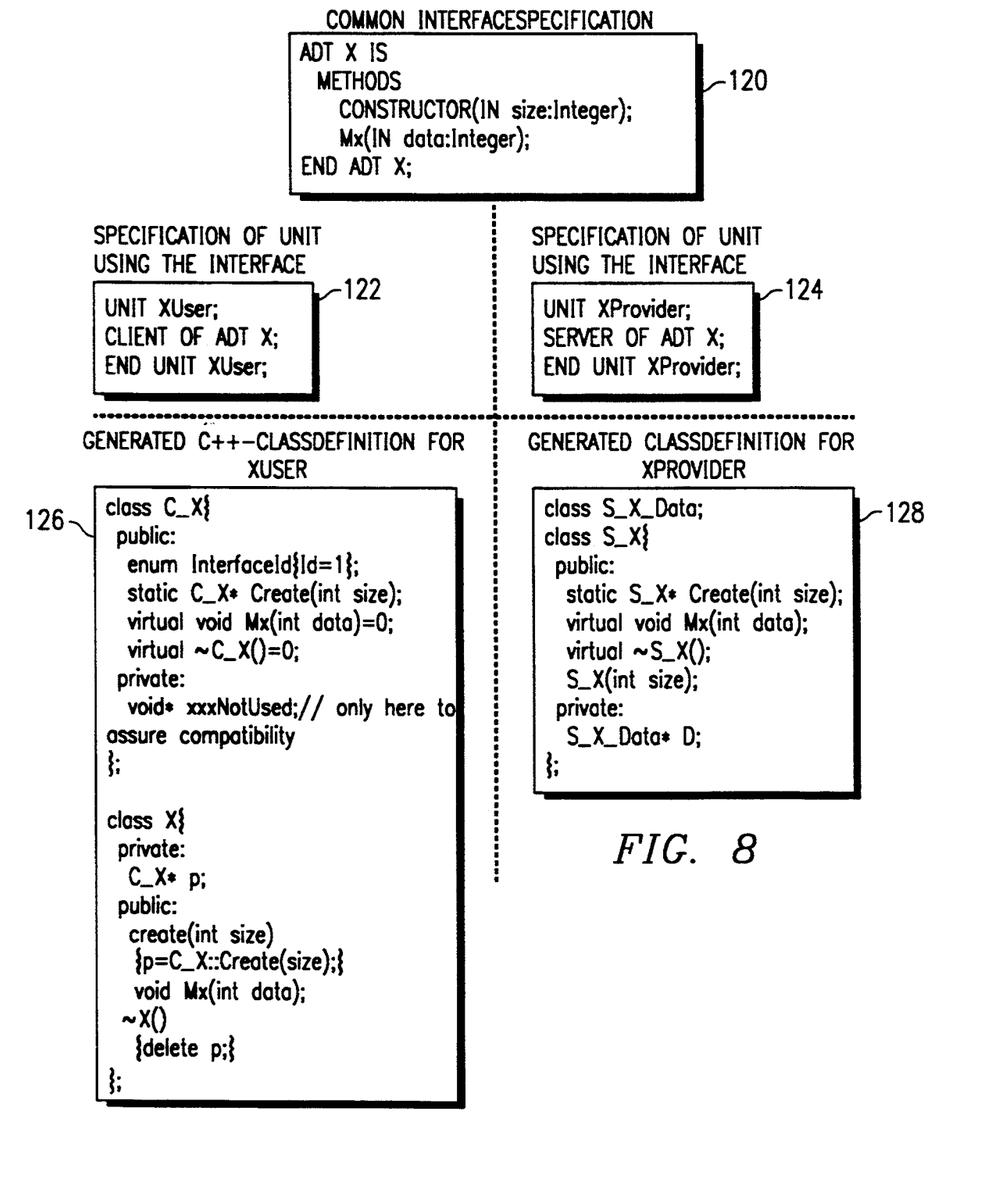
FIG. 8 is a chart illustrating certain aspects of the system of the present invention.

Referring next to FIG. 8, there is shown a certain arrangement of charts illustrating certain exemplary code blocks and their relationship to one another as employed in the system of the present invention. FIG. 8 illustrates the logical structure of certain generated files and written specifications as they might be implemented in the system of the present invention. At the highest level, the Common Interface Specification 120 defines an ADT "X" and the methods or operations possible to access for objects of that ADT. Logically subordinate to this ADT, at the next level of definition is a specification for a user unit 122 of the Interface Specification 120 and a specification for a provider unit 124 of the Common Interface Specification 120. The user unit specification 122 defines a client of the common interface, ADT X. The provider unit specification 126 defines a server of ADT X.

At the next logical level below the unit specifications 122 and 124 are the generated class definitions for users and providers respectively. The generated class definition for XUser 126 illustrates certain user classes defined for both public and private use. The generated class definition for XProvider 128 illustrates certain public and private definitions for provider data and functions.

As illustrated above, the system of the present invention enables the runtime inclusion or linking within a process to either new software or old software in a manner that enables software to be both effectively tested in real-time as well as to be smoothly and transparently substituted in a telecommunications network and switching system without disruption of the telecommunications traffic within the network.

It is thus believed that the operation and construction of the present invention will be apparent from the foregoing description. While the method, apparatus and system shown and described has been characterized as being preferred, it will be readily apparent that various changes and modifications can be made therein without departing from the spirit and scope of the invention as defined in the following claims.

What is claimed is:

1. A method of dynamically binding, within a computing system having a kernel, first and second software modules respectively contained within first and second software applications, said method comprising the steps of:
   providing a linked procedure call mechanism having a trader portion;
   providing a client interface, said client interface capable of accessing said trader portion;
   providing a server interface, said server interface capable of accessing said trader portion;
   inserting said client interface into said first software module;
   inserting said server interface into said second software module;
   identifying said client interface by executing said first software module;
   identifying said server interface by accessing said trader portion with said identified client interface; and
   substituting said server interface in place of said identified client interface, during execution of said first software module, thereby dynamically binding said first and second software modules.

2. The method of claim 1 further comprising the step of:
   generating said client interface and said server interface from a common interface specification.

3. The method of claim 2 wherein the step of generating said client interface and said server interface from a common interface specification includes the step of:
   generating, with an off-line stub generation tool, both client objects and server objects from said common interface specification, said off-line stub generation tool providing coordination between said client objects and said server objects.

4. The method of claim 3 wherein the step of generating, with an off-line stub generation tool, both client objects and server objects from said common interface specification includes the steps of:
   generating a file containing at least one client object; and
   generating a file containing at least one server object.

5. The method of claim 4 wherein the step of generating a file containing at least one client object includes the step of:
   generating a file containing one client object which is compatible with an associated server object in said generated file containing said server objects.

6. The method of claim 2 further comprising the step of:
   creating said common interface specification using an object-oriented interface description language.

7. The method of claim 6 wherein said step of creating said common interface specification further includes the steps of
   naming the common interface specification;
   identifying other interfaces used as a base for said named common interface specification;
   creating at least one constructor, said constructor demonstrating how to create instances of objects specifying said named common interface specification; and
   creating at least one method-specification for performing functions of said named common interface specification, said method-specification including a method name, arguments, return type and exceptions.

8. The method of claim 6 wherein the step of creating a common interface specification using an object-oriented interface description language includes the step of:
   creating said common interface specification from a base interface, said common interface specification inheriting specified methods of said base interface.

9. The method of claim 2 further comprising the step of:
   creating said common interface specification in a computer program language-independent fashion using an object oriented paradigm.

10. The method of claim 9 wherein the step of providing a client interface includes the step of:
    providing a client object, said client object capable of accessing said trader portion.

11. The method of claim 9 further comprising the step of:
    inserting said server interface's location into said trader portion.

12. The method of claim 9 wherein the step of providing a server interface includes the step of:
    providing a server object, said server object capable of accessing said trader portion.

13. The method of claim 12 further comprising the steps of:
    loading, into said computing system, a third software application containing a third software module, said third software module including server objects which are compatible with said server objects inserted into said second software module; and
    inserting the location of said server objects contained within said third software module into said trader portion.

14. The method of claim 13 further comprising the step of:
    directing a process, created prior to loading said third software module, to said second software module by accessing said trader portion with said kernel.

15. The method of claim 13 further comprising the step of:
    directing a process, created subsequent to loading said third software module, to said third software module by accessing said trader portion with said kernel.

16. A method of dynamically binding, within a computing system having a shared memory and a kernel, first and second software modules respectively contained within first and second software applications, said method comprising the steps of:
    providing a linked procedure call mechanism having a trader portion;
    loading said first software module into said shared memory of said computing system, said first software module including a client interface;
    loading said second software module into said shared memory of said computing system, said second software module including a server interface;
    inserting into said trader portion a memory address of said server interface;
    identifying said client interface by executing said first software module;
    identifying said server interface by accessing said trader portion with said identified client interface; and
    substituting said server interface by accessing said trader client interface, during execution of said first software module, thereby dynamically binding said first and second software modules.

17. The method of claim 16 further comprising the steps of:
    loading a plurality of software modules into said shared memory of said computing system, each of said plurality of software modules including an associated client interface; and
    substituting said server interface in place of each of said associated client interfaces being executed.

18. The method of claim 17 further comprising the steps of:
    inserting a plurality of server interfaces into said first software module;
    inserting a plurality of client interfaces compatible with said plurality of server interfaces into said second software module; and
    inserting the address of each of said plurality of server interfaces into said trader portion.

19. The method of claim 18 further comprising the step of:
    generating a unique number which identifies both said client interface and said server interface.

20. The method of claim 19 further comprising the steps of:
    inserting said generated unique number into said trader portion; and
    inserting said server interface's memory address into said trader portion.

21. An Apparatus for dynamically binding, within a computing system having a kernel, first and second software modules respectively contained within first and second software applications, said Apparatus comprising:
    means for providing a linked procedure call mechanism having a trader portion;
    means for providing a client interface, said client interface capable of accessing said trader portion;
    means for providing a server interface, said server interface capable of accessing said trader portion;
    means for inserting said client interface into said first software module;
    means for inserting said server interface into said second software module;
    means for identifying said client interface by executing said first software module;
    means for identifying said server interface by accessing said trader portion with said identified client interface; and
    means for substituting said server interface in place of said identified client interface, during execution of said first software module, thereby dynamically binding said first and second software modules.

22. The Apparatus of claim 21 further comprising:
    means for generating said client interface and said server interface from a common interface specification.

23. The Apparatus of claim 22 wherein the means for generating said client interface and said server interface from a common interface specification includes:
    means for generating, with an offline stub generation tool, both client objects and server objects from said common interface specification, said off-line stub generation tool providing coordination between said client objects and said server objects.

24. The Apparatus of claim 23 wherein the means for generating, with an off-line stub generation tool, both client objects and server objects from said common interface specification includes:
    means for generating a file containing at least one client object; and
    means for generating a file containing at least one server object.

25. The Apparatus of claim 24 wherein the means for generating a file containing at least one client object includes:
    means for generating a file containing one client object which is compatible with an associated server object in said generated file for said server objects.

26. The Apparatus of claim 22 further comprising:
    means for creating said common interface specification using an object-oriented interface description language.

27. The Apparatus of claim 26 wherein said means for creating said common interface specification further includes:
    a name for the common interface specification;
    means for identifying other interfaces used as a base for said named common interface specification;
    means for creating at least one constructor, said constructor demonstrating how to create instances of objects specifying said named common interface specification; and
    means for creating at least one method-specification for performing functions of said named common interface specification, said method-specification including a method name, arguments, return type and exceptions.

28. The Apparatus of claim 26 wherein the means for creating a common interface specification using an object-oriented interface description language includes:

means for creating said common interface specification from a base interface, said common interface specification inheriting specified methods of said base interface.

29. The Apparatus of claim 22 further comprising:
means for creating said common interface specification in a computer program language-independent fashion using an object oriented paradigm.

30. The Apparatus of claim 21 wherein the means for providing a client interface includes:
means for providing a client object, said client object capable of accessing said trader portion.

31. The Apparatus of claim 21 further comprising:
means for inserting said server interface's location into said trader portion.

32. The Apparatus of claim 21 wherein the means for providing a server interface includes:
means for providing a server object, said server object capable of accessing said trader portion.

33. The Apparatus of claim 32 further comprising:
means for loading, into said computing system, a third software application containing a third software module, said third software module including server objects which are compatible with said server objects inserted into said second software module; and
means for inserting the location of said server objects contained within said third software module into said trader portion.

34. The Apparatus of claim 33 further comprising:
means for directing a process, created prior to loading said third software module, to said second software module by accessing said trader portion with said kernel.

35. The Apparatus of claim 33 further comprising:
means for directing a process, created subsequent to loading said third software module, to said third software module by accessing said trader portion with said kernel.

* * * * *

UNITED STATES PATENT AND TRADEMARK OFFICE
CERTIFICATE OF CORRECTION

PATENT NO.   : 5,339,430
DATED        : Aug. 16, 1994
INVENTOR(S)  : Lundin et al.

It is certified that error appears in the above-indentified patent and that said Letters Patent is hereby corrected as shown below:

| | |
|---|---|
| Column 1, line 26 | Replace "Operation"<br>With --operation-- |
| Column 3, line 51 | Before "live"<br>Insert --remainder of the-- |
| Column 14, line 36 | Replace "Of"<br>With --of-- |
| Column 14, line 52 | Replace "One"<br>With --one-- |
| Column 17, line 32 | Replace "by accessing"<br>With --in place of-- |
| Column 17, line 33 | Replace "trader"<br>With --identified-- |

Signed and Sealed this

Twenty-second Day of April, 1997

Attest:

BRUCE LEHMAN

*Commissioner of Patents and Trademarks*

*Attesting Officer*